United States Patent [19]

Arakawa et al.

[11] Patent Number: 4,546,603
[45] Date of Patent: Oct. 15, 1985

[54] COAL GASIFICATION COMPOSITE POWER GENERATING PLANT

[75] Inventors: Tadao Arakawa; Yoshiki Noguchi; Yukio Hishinuma; Nobuo Nagasaki, all of Hitachi, Japan

[73] Assignees: Hitachi, Ltd.; Hitachi Engineering Co., Ltd., both of Tokyo, Japan

[21] Appl. No.: 618,553

[22] Filed: Jun. 8, 1984

[30] Foreign Application Priority Data

Jun. 10, 1983 [JP] Japan .................. 58-102650

[51] Int. Cl.[4] ............................................ F02C 3/28
[52] U.S. Cl. ........................... 60/39.12; 60/39.182
[58] Field of Search ..................... 60/39.12, 39.182; 122/4 D, 7 R

[56] References Cited

U.S. PATENT DOCUMENTS

| | | | |
|---|---|---|---|
| 4,099,374 | 7/1978 | Foster-Pegg | 60/39.12 |
| 4,288,979 | 9/1981 | Liljedahl et al. | 60/39.12 |
| 4,470,254 | 9/1984 | Chen et al. | 60/39.12 |
| 4,501,233 | 2/1985 | Kusaka | 60/39.182 |

Primary Examiner—Louis J. Casaregola
Attorney, Agent, or Firm—Antonelli, Terry & Wands

[57] ABSTRACT

A coal gasification composite power generating plant has a coal gasification plant and a composite power generating plant. The coal gasification plant has a low-pressure steam generator for recovering heat from the furnace wall of a pressurized fluidized bed type coal gasification furnace, and a high-pressure steam generator disposed at the outlet of the gasification furnace and adapted to recover heat from the unrefined gas coming from the gasification furnace. The composite power generating plant includes a gas turbine which uses the gas generated in the gasification plant as the fuel gas, a boiler for recovering heat from the exhaust gas of the gas turbine, and high-pressure and low-pressure steam turbines which operate with the steam generated by the boiler. The high-pressure steam generated in the high-pressure steam generator is introduced to the high-pressure steam turbine, while the steam generated in the low-pressure steam generator is introduced into the low-pressure steam turbine, thereby to effectively recover the energy.

5 Claims, 17 Drawing Figures

GAS REFIRING EFFICIENCY (HHV)

$$= \frac{\text{CALORIFIC VALUE OF GAS AT REFINER OUTLET + SENSIBLE HEAT + LATENT HEAT}}{\text{CALORIFIC VALUE OF GAS AT REFINER INLET + SENSIBLE HEAT + LATENT HEAT}}$$

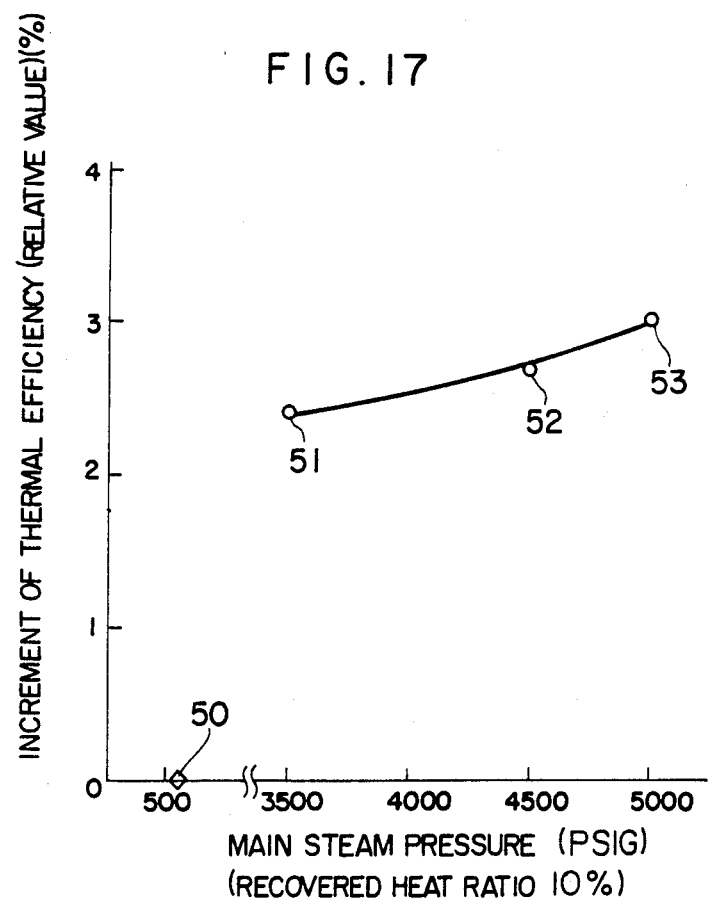

COAL GASIFICATION COMPOSITE POWER GENERATING PLANT

FIELD OF THE INVENTION

The present invention relates to a coal gasification composite power generating plant incorporating a gasification furnace of pressurized jet fluidized bed type in which the gasification is conducted at a pressure higher than the atmospheric pressure. More particularly, the invention is concerned with a coal gasification composite power generating plant in which the heat recovery in the steam generator at the outlet of the gasification furnace is made by a higher steam condition than that in the heat recovery in the gas cooler of the gasification furnace thereby to achieve a higher thermal efficiency of the plant as a whole.

BRIEF DESCRIPTION OF THE DRAWINGS

FIG. 17 is a graph showing the relationship between the main steam pressure and the increment of thermal efficiency.

DESCRIPTION OF THE PRIOR ART

Figure 1:
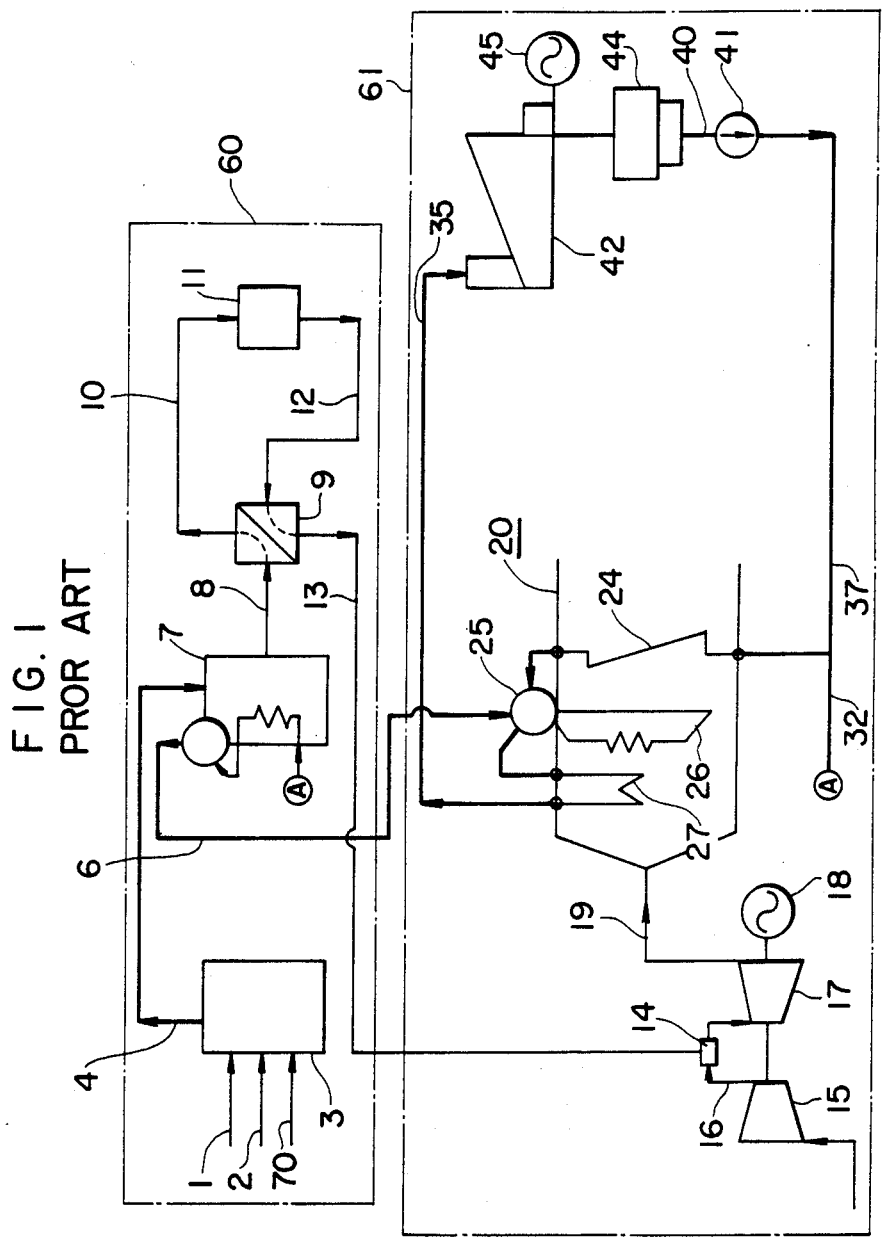
FIGS. 1 and 2 are diagrams of examples of conventional coal gasification composite power generating plant.
Figure 2:
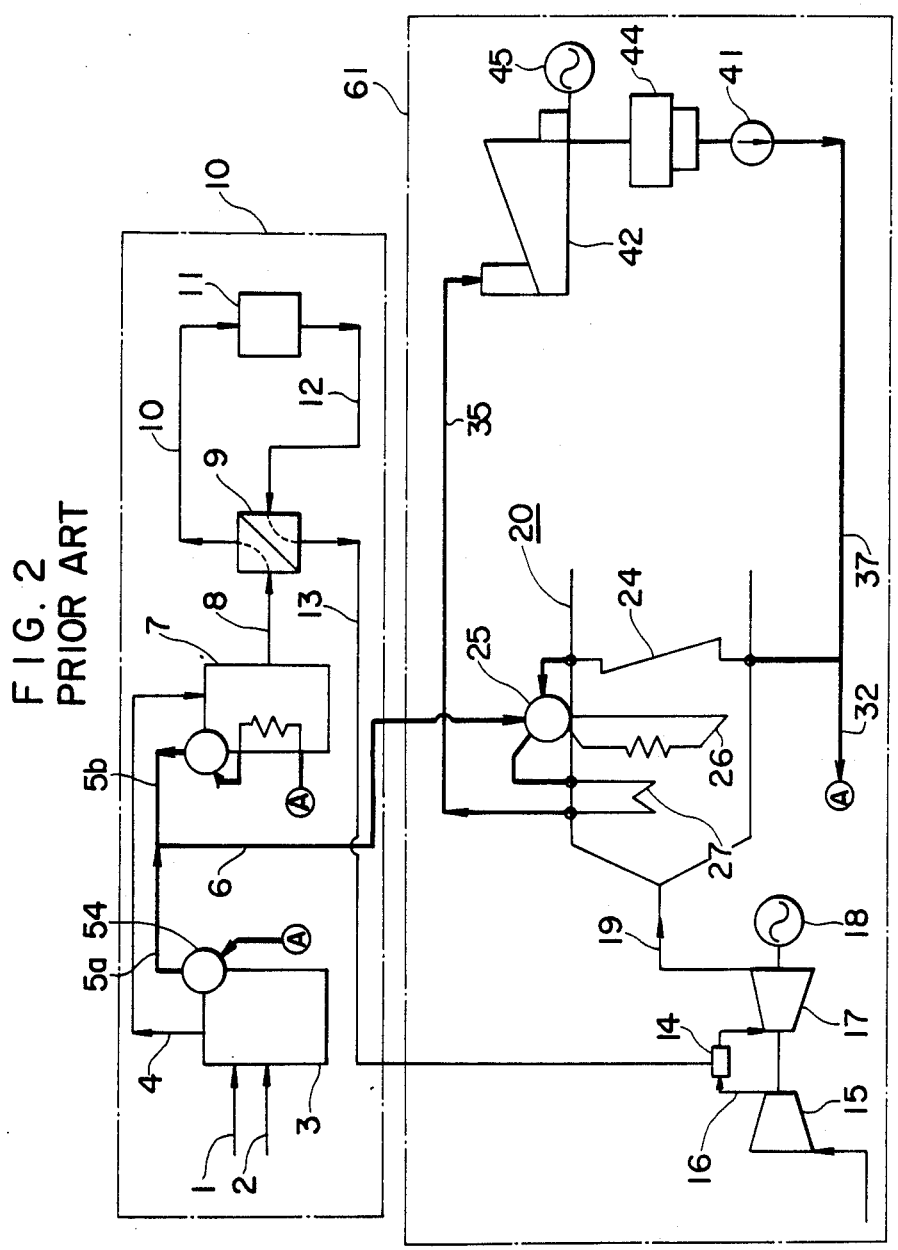

FIGS. 1 and 2 show examples of heat cycle of conventional gasification composite power generating plant.

Referring to these Figures, coal 1 is gasified in a gasification furnace 3 through the action of a gasification agent 2 which is air or oxygen. The unrefined gas 4 available at the outlet of the gasification furnace is cooled in a drum-type steam generator 7. The sensible heat possessed by the unrefined gas 4 is therefore collected by the steam generated in the steam generator 7. The unrefined gas 8 available at the outlet of the drum-type steam generator 7 is subjected to a heat exchange with the refined gas 12 in a gas/gas heat exchanger 9. The gas 10 cooled through this heat exchange down to the low temperature necessary for the refining is then refined in the gas refining apparatus 11. The refined gas 12 thus produced is heated through a heat exchange in the gas/gas heat exchanger 9 and is introduced as a fuel gas 13 into a combustor 14 of the gas turbine so as to be burnt in the combustor. The gas turbine 17 then drives the gas turbine 17 which in turn drives an alternator 18 to produce electric power.

The heat recovery system includes a combination of a waste heat boiler 20 and the above-mentioned drum-type steam generator 7. The waste heat boiler 20 recovers the heat from the exhaust gas of the gas turbine by generating steam through exchange with the exhaust gas, while the drum-type steam generator 7 recovers the sensible heat possessed by the unrefined gas 4 at the outlet of the gasification furnace by generating steam through heat exchange with the gas 4.

The steam generated in an economizer 24 and an evaporator 26 is superheated by a superheater 27 and is expanded through a steam turbine 42 which in turn drives an alternator 45 to generate electric energy.

The steam which has been expanded through the steam turbine 42 is cooled and condensed in a condenser 44 to become a condensate 40 which is then fed as the boiler feed water to the waste heat boiler 20 and the drum-type steam generator 7 through feed water pipes 37 and 32.

The temperature of the unrefined gas 4 at the outlet of the gasification furnace is generally 900° C. or higher although it depends on the kind of the gasification furnace. On the other hand, the unrefined gas 4 has to be refined before it is used as the fuel gas for the gas turbine, in order to prevent the corrosion of the gas turbine and to prevent environmental pollution. To this end, it is necessary to cool the unrefined gas down to a temperature suitable for the refining conducted by the refining apparatus 11. The temperature suitable for the refining can be broadly sorted into two classes, depending on the kind of the gas refining apparatus employed.

The gas temperature is about 500° C. in the dry gas refining in which dust removal at high temperature is effected by using granular bed and desulfurization is effected by an adsorbent such as iron oxide. On the other hand, in the wet gas refining in which the gas is scrubbed in a water scrubber and then refined by an adsorbent which is an organic solvent, the optimum refining temperature is about 100° C. The dry desulfurization, however, has not been put into practical use, but is under development. Thus, the wet type gas refining apparatus is used as the refining apparatus 11 of the coal gasification composite power generating plant. It is, therefore, one of the important factors for attaining high efficiency of the coal gasification power generating plant to make an efficient use of the sensible heat of the unrefined gas, i.e. the difference of the heat posessed by the gas of about 900° C. available at the outlet of the gasification furnace and the gas of about 100° C. available at the inlet to the gas refining apparatus 11.

The sensible heat posessed by the unrefined gas 8 flowing from the outlet of the gasification furnace to the inlet of the gas refining apparatus 11 is recovered usually through a reheating of the fuel gas 12 or heating of the steam or the feed water. It is known that the thermal efficiency of the coal gasification power generating plant is increased as the rate of recovery of the above-mentioned sensible heat through heating of the fuel gas 12 is increased. For information, about 0.2% increase (relative value) of the thermal efficiency is attainably by 100° C. rise of the fuel gas temperature. On the other hand, however, the fuel gas temperature at the inlet of the combustor 14 is required to range between about 100° C. and 400° C., mainly from the view point of heat resistance of the fuel controller. The reheating of the fuel gas 12 is usually conducted by the gas/gas heat exchanger 9. In the heat exchange conducted through the gas/gas heat exchanger 9, it is an ordinary way to select the temperature of the heating gas, i.e. the unrefined gas 8, to be about 50° C. higher than the temperature of the fuel gas 13 at the inlet of the combustor. Thus, the unrefined gas 4 coming out of the gasification furnace experiences a temperature drop of more than about 500° C. until it becomes the heating gas 8 flowing into the gas/gas heat exchanger 9. The recovery of the sensible heat corresponding to this temperature drop, therefore, is an important factor for attaining the high thermal efficiency of the plant as a whole.

It is well known that the recovery of this sensible heat can be attained effectively by means of a steam generator 7 disposed at the outlet of the gasification furnace, so that the heat is recovered through generation of steam.

In the gasification furnace of flowing bed type, the ash content in the coal is molten and extracted from the lower side of the furnace, so that the gasification reaction temperature well exceeds 1500° C. Therefore, it is necessary to cool the unrefined gas for the purpose of protection of the gasification furnace wall and so forth.

As a measure for cooling the gas and protecting the furnace wall, it has been proposed to blow steam as a cooling medium into the gasification furnace and to surround the gasification furance by refractory walls. It has been proposed also to add water to the material coal so that the coal is supplied in the form of slurry, thereby to cool the gas. These measures, however, undesirably increase the water content of the unrefined gas 4 at the gasification furnace outlet, because the gas is directly cooled by water or steam blown into the furnace.

As explained before, the refining of the gas 4 derived from the gasification furnace is usually conducted by wet refining process. It is well known that, when the wet refining process is adopted, the water content of the unrefined gas 4 is removed during the refining so that the thermal efficiency in the gas refining is decreased, resulting in a reduction of the thermal efficiency of the plant as a whole.

Figure 3:
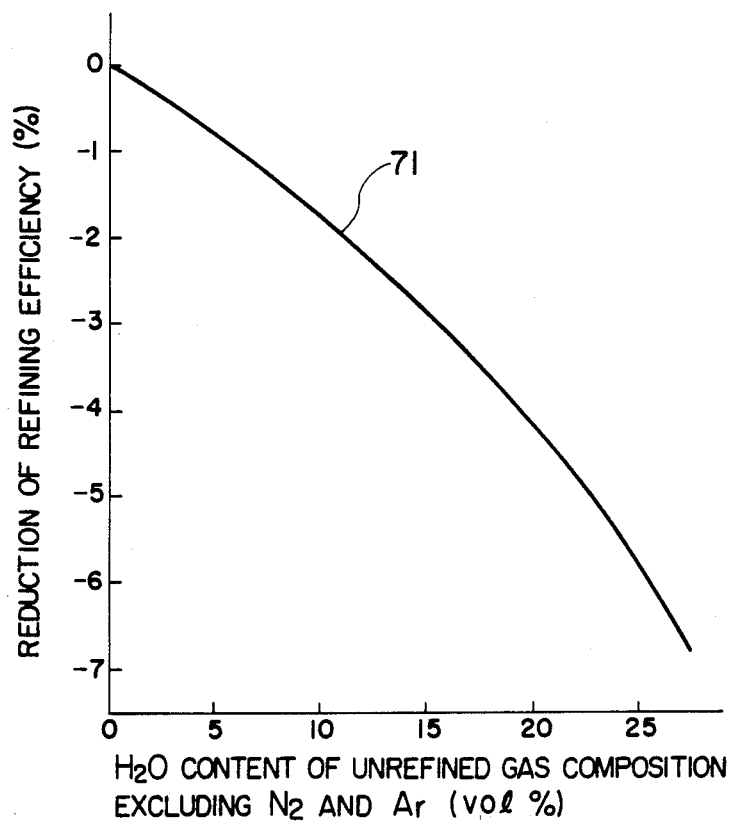
FIG. 3 is a graph showing how the water content of the unrefined gas affects the refining efficiency.
Figure 4:
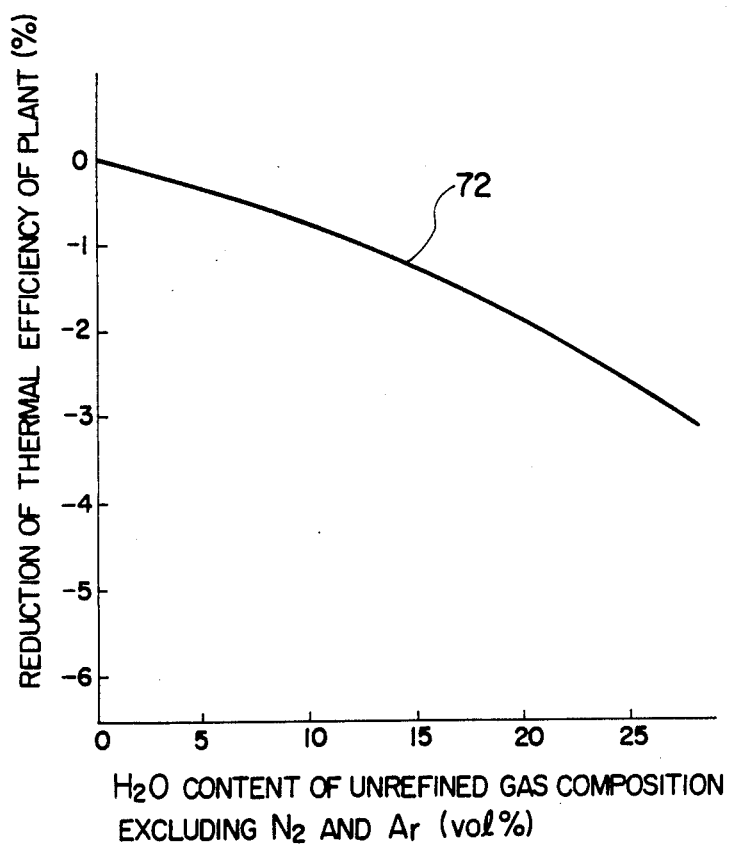
FIG. 4 is a diagram showing how the thermal efficiency of the plant is affected by the thermal efficiency of the plant.

To explain in more detail in this connection, FIG. 3 shows the thermal efficiency in the gas refining in relation to the water content of the unrefined gas 4. The water content, in this case, is the ratio of the amount of water to the amount of combustible part of the unrefined gas, i.e. the amount of gas from which incombustible substances such as $N_2$ and Ar has been removed. From FIG. 3, it will be understood that the thermal efficiency in the gas refining is decreased as the water content of the unrefined gas is increased. FIG. 4 shows how the thermal efficiency of the plant as a whole is affected by the water content of the unrefined gas. It will be understood that the thermal efficiency of the plant is decreased as the water content is increased.

In an example of the system in which the coal is mixed with water and supplied in the form of slurry, the water content of the unrefined gas excluding $N_2$ and Ar, derived from gasification furnace, is about 20% and about 25%, respectively, when oxygen and air are used as the refining agent. Consequently, when oxygen is used as the refining agent, the thermal efficiency in the refining and the thermal efficiency of the whole plant are decreased by 4% and about 1.5%, respectively, as compared with the case where no removal of the water content is conducted. On the other hand, when air is used as the refining agent, the thermal efficiency in the gas refining and the thermal efficiency of the whole plant are decreased by about 6% and about 2.5%, respectively, as compared with the case where no removal of water is conducted.

Under these circumstances, a system as shown in FIG. 2 has been proposed in which the gasification furnace is provided with water-cooled furnace wall so that the heat produced by the gasification reaction in the furnace 3 is recovered through generation of steam 5 from the water circulated through the water-cooled furnace wall. More specifically, in the system shown in FIG. 2, the steam 5a generated in the gas cooler 54 of the gasification furnace and the steam 5b generated by the steam generator 7 at the gasification furnace outlet are merged in each other to become steam 6 which is then mixed with the steam produced in the steam drum 25 of the waste heat boiler 20 for recovering the waste heat from the gas turbine. The mixture of the steam is then superheated in a superheater 27 to become superheated steam 35 which is then introduced through a main steam pipe 35 into a steam turbine 42.

The gasification furnace having water-cooled furnace wall for cooling the gas under reaction as shown in FIG. 2 involves the following problem. Namely, in this type of gasification furnace, as the pressures of the steam generated in the gas cooler 54 and the steam generator 7 at the furnace outlet are increased, the temperature of the metal constituting the water-cooled furnace wall is increased to enhance the tendency of hot corrosion of the water-cooled furnace wall by $H_2S$, so that the pressure of the steam as the heat recovering medium cannot be raised sufficiently, failing to effectively recover the heat possessed by the produced gas.

Figure 5:
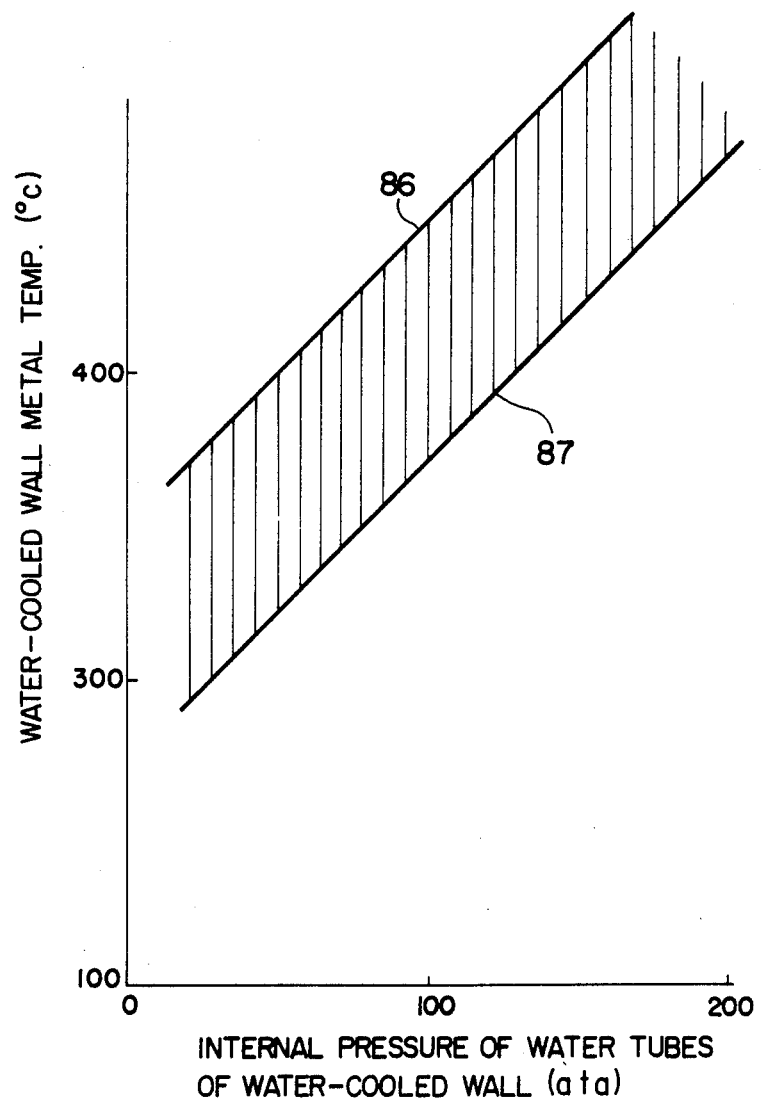
FIG. 5 is a diagram showing the relationship between the pressure in the tubes of the water-cooled furnace wall and the metal temperature.

FIG. 5 shows the relationship between the pressure in the tubes constituting the water-cooled furnace wall and the temperature of the metal constituting the same. The temperature 87 of the inner surface of the metal of the furnace wall contacting the water is maintained at a level substantially equal to the saturation temperature corresponding to the water pressure, and the temperature 86 of the external surface of the metal is held at a level which is usually about 100° F. higher than the temperature 87 of the inner surface of the metal.

The produced gas usually contains about 0.05 to 1% of $H_2S$, although this content varies depending on the S content of the coal. In the case of the gasification furnace of pressurized type, the thermal load per unit volume of the gasification furnace is large as compared with the case of the furnace which operates under atmospheric pressure. In the gasification furnace of pressurized type, therefore, the heat input to the water-cooled furnace wall per unit area of the latter is greater than that in the ordinary furnace operating under atmospheric pressure. Consequently, the temperature of the metal in the water-cooled furnace wall is increased to promote the hot corrosion by $H_2S$.

Figure 6:
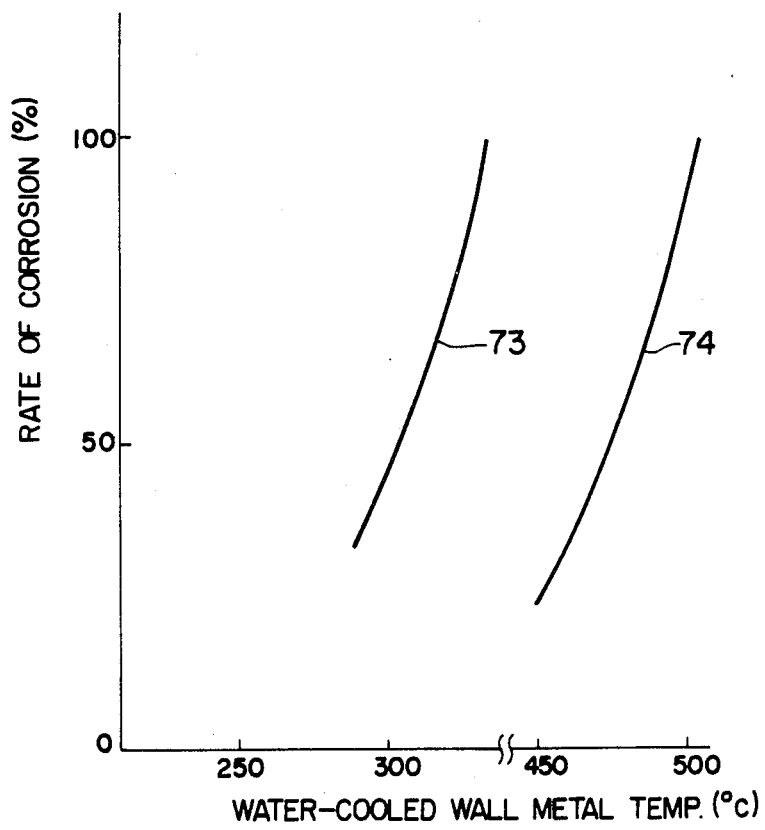
FIG. 6 is a graph showing the relationship between the metal temperature and the speed of corrosion.

FIG. 6 shows the relationship between the metal temperature and the rate of corrosion. In this Figure, the 100% rate of corrosion means that the water tube constituting the water-cooled furnace wall is corroded to become unusable in the period of the life of the plant which is usually 10 to 20 years. The curve 73 shows the relationship between the metal temperature and the corrosion rate as obtained under the thermal load in the area of the gasification furnace where the gasification reaction is proceeding, while the curve 74 shows the relationship as obtained at the outlet portion of the gasification furnace where the gas has been cooled already.

In order to diminish the hot corrosion by $H_2S$, it is effective to lower the metal temperature by reducing the pressure of the water in the tubes of the water-cooled furnace wall or to decrease the thermal load per unit area of the water-cooled furnace wall.

In the case of the coal gasification in particular, the unburnt carbon left after the reaction amounts about 0.5 to 5% of the coal initially charged to the gasification furnace. This unburnt carbon together with other dusts acts to reduce the wall thickness of the tubes of the water-cooled furnace wall, thereby promoting the corrosion by $H_2S$.

In the case of the fluidized bed type gasification furnace, the ash content in the coal is molten and extracted from the lower side of the furnace as stated before. An innegligible part of the molten ash, however, accompanies the produced gas to reduce the wall thickness of the water tubes of the water-cooled furnace wall to undesirably accelerate the corrosion by $H_2S$.

The most common measure for protecting the tubes against the corrosion by $H_2S$ at high temperature is to decrease the water pressure in the tubes of the water-cooled wall surface to lower the metal temperature of the water-cooled surface. From the view point of increase of the thermal efficiency of the plant as a whole, however, it is not a good policy to collect and recover the heat through generation of low pressure steam, considering that the heat amounting to about 15 to 40% of the total heat input (product of amount of coal charged and the calorific power of the coal) is recovered by the gas cooler of the gasification furnace and the steam generator 7 provided at the outlet of the gasification furnace.

The second method for preventing the corrosion is to protect the tube wall by a refractory material and to decrease the thermal load per unit area of the water-cooled furnace wall. This method, however, requires greater height of the gasification furnace, because the flow velocity of the gas in the furnace cannot be decreased below a predetermined value in order to satisfactorily gluidize the fine powders of the coal. The height of the gasification furnace, however, should be less than one hundred meters and, preferably, several tens of meters, from the view point of transportation and installation of the furnace. It is, therefore, impossible to overcome the above-described problem solely with this method.

The third method for obtaining a solution to the above-described problem is to decrease the thermal load imposed on the furnace wall by reducing the gas pressure in the furnace to allow the furnace to have a greater diameter. This method, however, encounters the following problem. Namely, the gas produced through the gasification has to be compressed at least to 250 psi before it is fed as the fuel gas to the gas turbine. In order to compress the large quantity of hot fuel gas, the compressor has to consume power which is impractically large from the view point of increase of the thermal efficiency of the plant as a whole.

The fourth solution to the above-described method is to coat the water-cooled furnace wall with a refractory material such as ceramics to prevent the wall from being contacted by the hot gas directly. This solution, however, cannot ensure a high reliability due to problems such as cracking attributable to the difference of the thermal expansion between the coating material and the water-cooled tube.

Thus, all of the conventional solutions are still unsatisfactory from the view point of achievement of higher thermal efficiency of the plant as a whole. Under these circumstances, there is an increasing demand for a system, as well as the technic for constructing the gasification furnace, which permits the recovery of the heat through generation of steam of higher pressure and temperature, while avoiding the undesirable corrosion by $H_2S$ at high temperature.

The thermal efficiency of the coal gasification power generating plant as a whole is defined by the following.

Thermal efficiency of the plant as a whole =
(electric output (KW) × 860) ÷
{(input heat by fuel (Kcal/kg)) ×
(fuel consumption (kg/H))}

On the other hand, the thermal efficiency in the gas refining is defined as follows.

Thermal efficiency in refining =
{(calorific value of gas at gas refiner outlet (Kcal/H)) +
(sensible heat of gas at gas refiner outlet (Kcal/H)) +
(latent heat of gas at gas refiner outlet (Kcal/H)} ÷
{(calorific value of gas at gas refiner inlet (Kcal/H)) +
(sensible heat of gas at gas refiner inlet (Kcal/H)) +
(latent heat of gas at gas refiner inlet (Kcal/H))}

SUMMARY OF THE INVENTION

Accordingly, an object of the invention is to provide a coal gasification composite power generating plant incorporating a pressurized fluidized bed type gasification furnace, wherein the heat recovery is made by a gas cooler in the gasification furnace and by a steam generator being made through generation of steam of higher steam pressure than that in the heat recovery by the gas cooler, thereby to improve the thermal efficiency of the plant.

More specifically, according to the invention, there is provided a coal gasification composite power generating plant comprising: a coal gasification plant having a coal gasification furnace of pressurized fluidized bed type, in which coal is gasified at a pressure higher than the atmospheric pressure, a first steam generator for recoving heat from the gas generated in the gasification furnace thereby to cool the gas, a second steam generator disposed at the outlet of the coal gasification furnace and adapted to recover heat from the unrefined gas coming out of the gasification furnace, and a gas refining apparatus for refining the unrefined gas which has been cooled through heat recovery by the second steam generator; and a composite power generating plant including a gas turbine which operates using the gas generated by the gasification plant as the fuel, a boiler for recovering heat wasted from the gas turbine, and high-pressure and low-pressure steam turbines which operate with the steam generated by the boiler; wherein the improvement comprises that the steam generated in the second steam generator has a pressure higher than that of the steam generated in the first steam generator, and the low-pressure steam and the high-pressure steam from the steam generators are introduced, respectively, to the low-pressure steam turbine and the high-pressure steam turbine.

In the coal gasification composite power generating plant, steam supplied to the steam turbine is produced by the heat recovered by a waste heat boiler for collecting the waste heat from the gas turbine and the heat recovered by the steam generator of the coal gasification plant. On the other hand, the process steam required for the refining of the gas is extracted from the steam turbine plant, and is collected again in the form of drain. Thus, the coal gasification plant and the composite power generating plant have an integrated heat recovery system. It is, therefore, quite important to realize rational construction of heat cycles with whole part of the coal gasification composite power generating plant, for attaining a high thermal efficiency of the plant as a whole.

According to the invention, the gas produced in the gasification furnace is cooled by the gas cooler of a gasification furnace down to such a temperature as would not permit the molten ash in the coal to be scattered to the outside of the gasification furnace, e.g. down to 1600° to 200° F., and a hot dust-removing apparatus is provided at the outlet of the gasification furnace. The steam generated through the heat recovery in the steam generator has a higher pressure than the steam generated through heat recovery in the gas cooler of the gasification furnace, so that the corrosion of the water tubes constituting the water-cooled furnace wall by H$_2$S is suppressed advantageously. Consequently, the thermal efficiency of the plant as a whole is increased without imparing the life of the plant.

Particularly, when the steam generator is of through-flow type, the steam generator can have only few, e.g. 1 to 3, steam drums so that the control of the water levels in the drums is facilitated to stabilize the operation as compared with the conventional coal gasification composite power generating plant.

DESCRIPTION OF THE PREFERRED EMBODIMENTS

Figure 7:
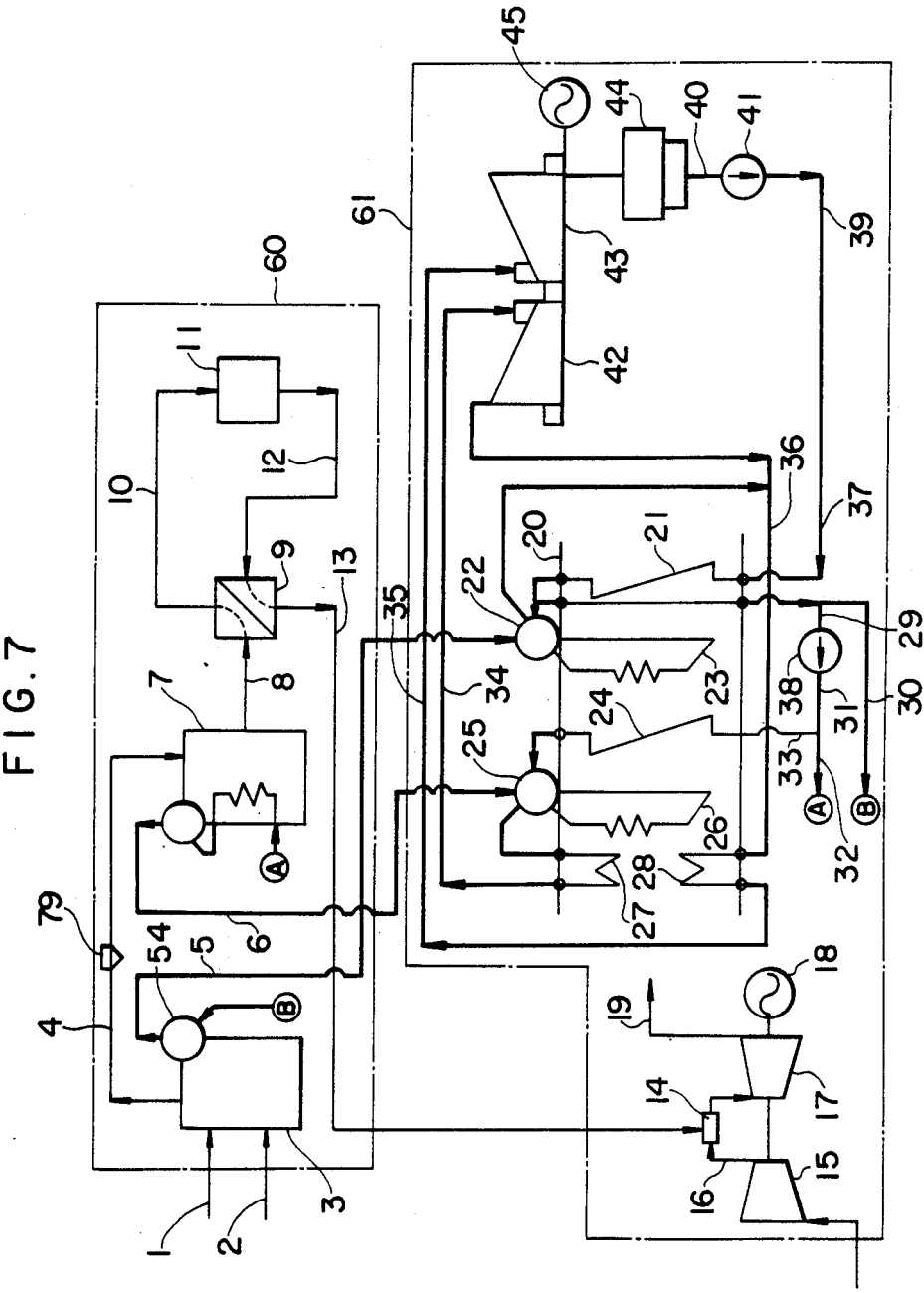
FIG. 7 is a diagram of one embodiment of the heat cycle of a coal gasification composite power generating plant in accordance with the invention.

FIG. 7 shows a first embodiment of the invention. The fuel 13 produced by the coal gasification plant 60 is mixed with air compressed by a compressor 15 and the mixture is burnt in a combustor 14 to become hot gas which expands through a gas turbine 17 to drive the latter. The gas turbine 17 in turn drives an alternator 18 to produce electric power.

This plant has a heat recovery system which is constituted by three sub-systems; namely, a first sub-system including a waste heat boiler 20 which generates steam through heat recovery from the exhaust gas of the gas turbine, a second sub-system including a drum-type steam generating gas cooler 54, and a third sub-system including a drum-type steam generator for generating steam through the recovery of the sensible heat of the gas 4 available at the outlet of the gasification furnace.

The waste heat boiler 20 is constituted by a low-pressure economizer 21, low-pressure drum 22, low-pressure generator 23, high-pressure economizer 24, high-pressure drum 25, high-pressure steam generator 26, superheater 27 and a reheater 28.

The condensate 40 is boosted by a feed water pump 41 and is fed to the low-pressure economizer 21 through a feed water pipe 37. Although not shown in FIG. 7, the supply of the condensate to the low-pressure economizer 21 is made after a heating by a low-pressure feed water heater or a deaerator.

The feed water line branches at the outlet of the low-pressure economizer 21 into a line leading to the low-pressure drum 22, a line 30 for gasification furnace cooling system and a line 29 leading to a high-pressure feed water pump 38. The outlet side of the high-pressure feed water pump 38 is branched into two lines: namely, a line leading to the high-pressure economizer and a line leading to the steam generator 7 at the furnace outlet. The feed water 33 supplied to the high-pressure economizer 24 is fed to the high-pressure drum 25 and is changed into steam in the latter. On the other hand, the feed water 32 supplied to the steam generator 7 of the furnace outlet is changed in the latter into steam of high pressure.

The stam thus generated is superheated through the superheater 27 and expands through the steam turbines 42, 43 to drive an alternator 48 thereby to produce electric power. The steam coming out of the steam turbine 43 is cooled and condensed into the condensate 40 in the condenser 44. The condensate 40 is then fed as the feed water to the waste heat boiler 20 by the feed water pump 41.

In the described embodiment, the gas produced in the gasification furnace 3 is cooled by the water-cooled furnace wall. Namely, the heat is recovered from the gas through generation of low-pressure steam in the water tubes of the water-cooled furnace wall. Consequently, the temperature of the gas 4 at the gasification furnace outlet is lowered to such a level as not to allow the molten ash to be scattered to the outside of the furnace. In addition, a hot dust-removing apparatus 79 is disposed at the outlet of the gasification furnace 3 to arrest and remove the unburnt carbon and ash. For these reasons, therefore, it is possible to suppress the tendency of corrosion by H$_2$S of the metal parts of the steam generator 7 at the furnace outlet. This in turn permits the a higher pressure in the drums of the steam generator 7 at the furnace outlet than in the drum of the gas cooler 54 of the gasification furnace.

Figure 8:
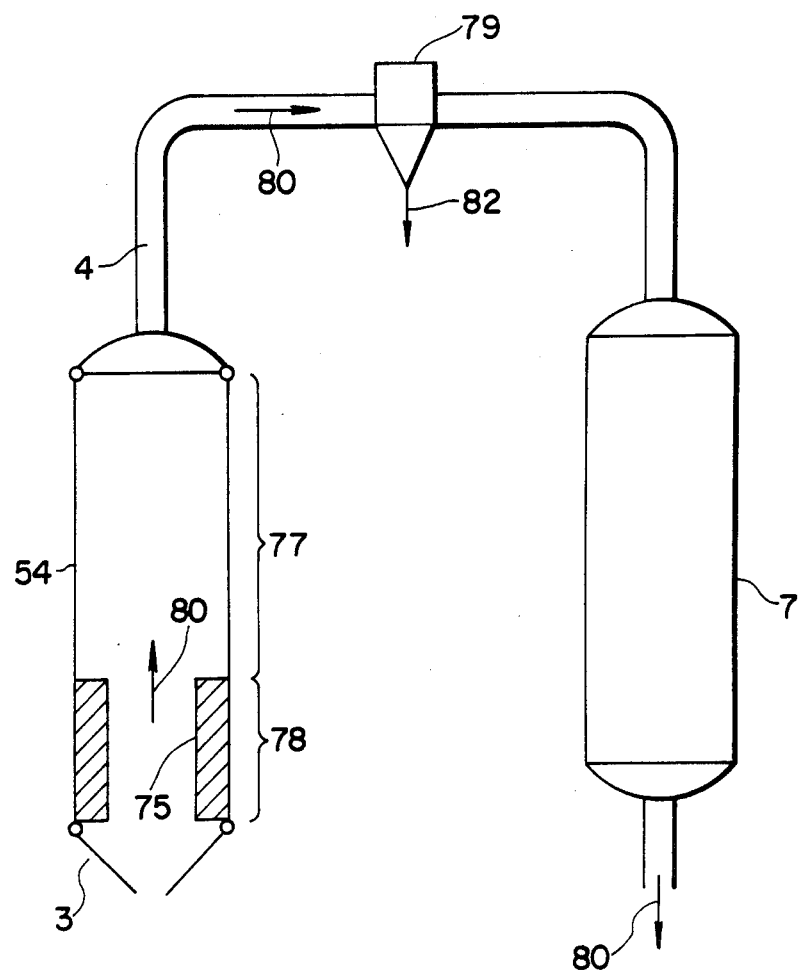
FIG. 8 is an illustration of a gasification furnace.

The construction of the gasification furnace 3 used in this embodiment will be described hereinunder with specific reference to FIG. 8.

In the gasification zone 78 in which a specifically high temperature is developed as a result of the gasification reaction, the water tubes of the gas cooler 54 is coated and protected by a refractory wall 75. Preferably, the pressure in the drum of the gas cooler 54 of the gasification furnace is selected to be about 20 to 2000 psi higher than the pressure in the gasification furnace, in order to prevent the gas in the furnace from coming into the water side even in the event of a rupture of the water tube of the gas cooler 54 in the gasification furnace. In the ordinary gasification furnace of pressurized fluidized bed type, the internal pressure of the furnace is selected to be about 100 to 1000 psig. In the described embodiment, the internal pressure of the furnace is 450 psig. The gas produced through the gasification reaction is cooled to a temperature of between about 1600° and 2000° F. which does not cause scattering of the molten ash to the outlet of the gasification furnace 3 from the gas cooling zone, assuming that the pressure in the drum of the gas cooler of the gasification furnace is 550 psig.

Furthermore, about 70 to 90% of the dust suspended by the gas 4 available at the gasification furnace outlet is removed by the dust-removing apparatus disposed at the outlet side of the gasification furnace 3.

Consequently, it is possible to decrease the heat flux in the gas cooler of the gasification furnace down to about ½ to 1/10 of that at the outlet of the gasification zone 78 of the gasification furnace 3, and the concentration of the dust in the gas 4 at the outlet of the gasification furnace can be decreased to about ⅛ to 1/10. Consequently, the high-temperature corrosion of the metal parts of the steam generator 7 at the furnace outlet can be effectively suppressed even if the steam pressure in this steam generator is maintained at a level higher than that in the drum of the gas cooler 54 in the gasification furnace.

By increasing the steam pressure in the steam generator 7 at the furnace outlet from 550 psig to 2700 psig, it is possible to attain about 0.7% increase and about 1.1% increase (relative values) of the thermal efficiency of the plant, respectively, when oxygen and air are used as the gasification agent in the gasification furnace.

Figure 9:
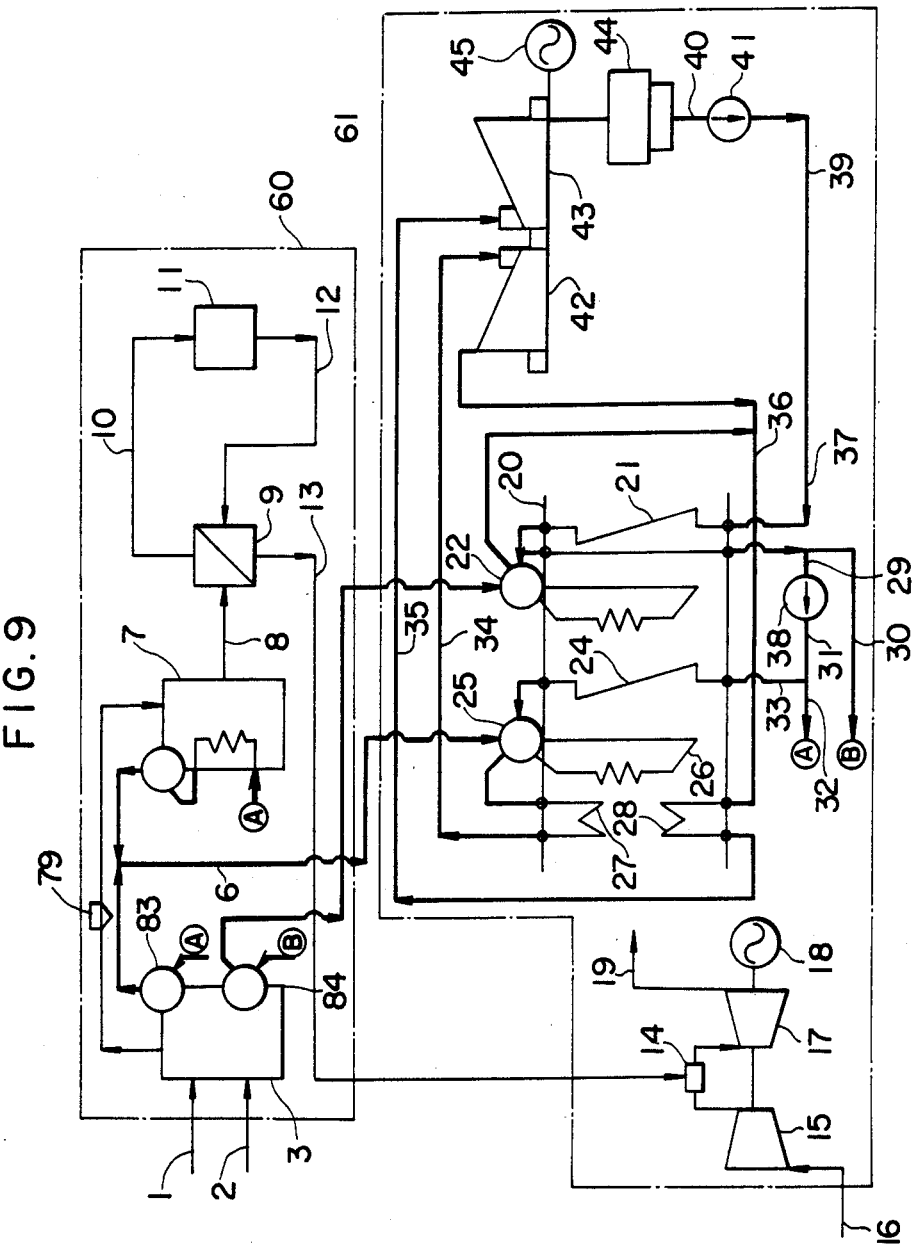
FIG. 9 is a diagram of a heat cycle of another embodiment of the invention.

FIG. 9 shows the heat cycle of another embodiment of the invention. In this embodiment, the gas cooler of the gasification furnace is divided into a gas cooler 83 for generating high-pressure steam and a gas cooler 84 for generating low-pressure steam. In this embodiment, therefor, part of the steam generated by the gas cooler of the gasification furnace is made to have higher pressure than the other part, thereby to further improve the thermal efficiency of the plant as a whole.

The steam of high pressure generated in the gas cooler 83 for generating high-pressure steam is mixed with the high-pressure steam generated by the steam generator 7 at the gasification furnace outlet, and the mixture steam is superheated through the superheater 27 and sent to the steam turbine.

Figure 10:
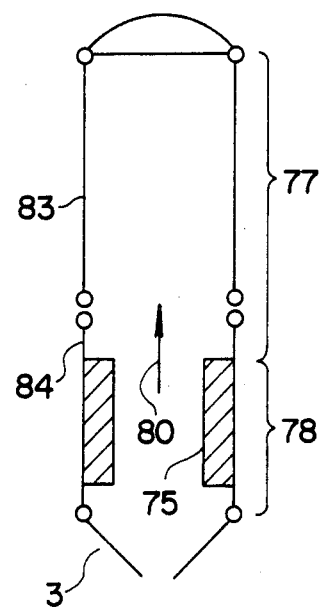
FIG. 10 is an illustration of a gasification furnace incorporated in the embodiment shown in FIG. 9.

FIG. 10 shows the construction of the gasification furnace used in the embodiment shown in FIG. 9. The water tubes of the gas cooler 83 for generating high-pressure steam are subjected to a large thermal load and, hence, to be corroded by $H_2S$. To avoid the corrosion, these water tubes are coated by a refractory material or has a double-tube type construction. Such countermeasures against corrosion, however, undesirably decreases the coefficient of heat transfer across the walls of these tubes, resulting in a lower thermal efficiency. In order to compensate for the reduction of the heat transfer, therefore, the water tubes of the gas cooler 83 for generating high-pressure steam have greater length. The greater length of these tubes is effective also in preventing the scattering of the molten ash to the outlet of the gasification furnace 3.

According to this second embodiment of the invention, by increasing the steam pressure in the gas cooler 83 from 550 psig to 2700 psig, it is possible to achieve about 1.4% increase and about 2% increase (relative values) of the thermal efficiency over the conventional arrangements, respectively, when oxygen and air are used as the gasification agent.

Figure 11:
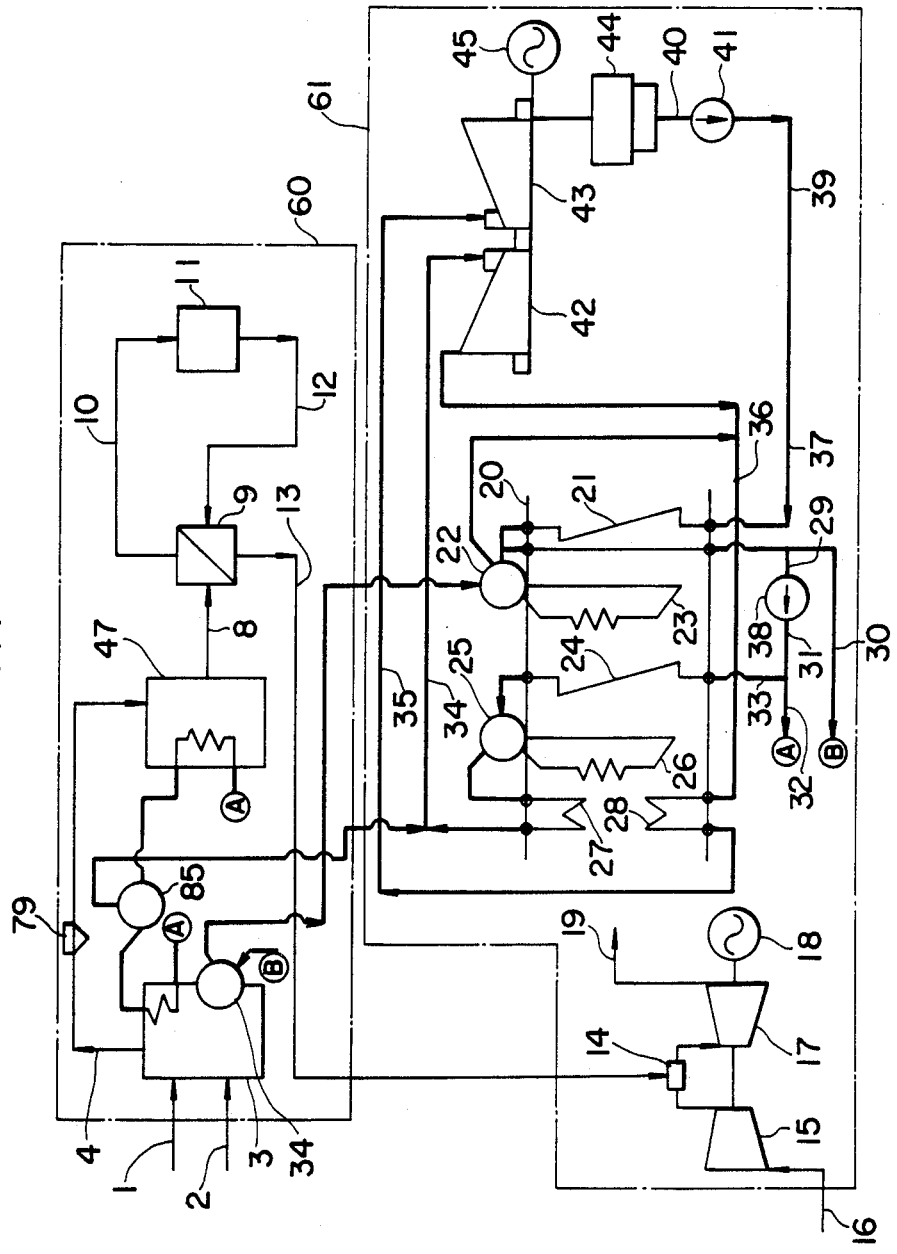
FIGS. 11 to 15 are diagrams of the heat cycles of different embodiments of the invention.

FIG. 11 shows the heat cycle of a third embodiment of the invention. In this embodiment, the gasification furnace 3 and the steam generator 47 at the outlet of the gasification furnace are arranged in the close proximity of each other so that the gas cooler of the gasification furnace and the steam generator at the furnace outlet make a common use of the high-pressure steam drum 85. This embodiment provides a substantially equal increment of the thermal efficiency of the plant to that achieved by the second embodiment. In addition, the cost for the construction and installation of the plant gan be decreased as compared with the second embodiment in which the gas cooler in the gasification furnace and the steam generator at the furnace outlet have independent drums, because the number of the steam drums, number of circulating pumps and so forth can be decreased.

Figure 12:
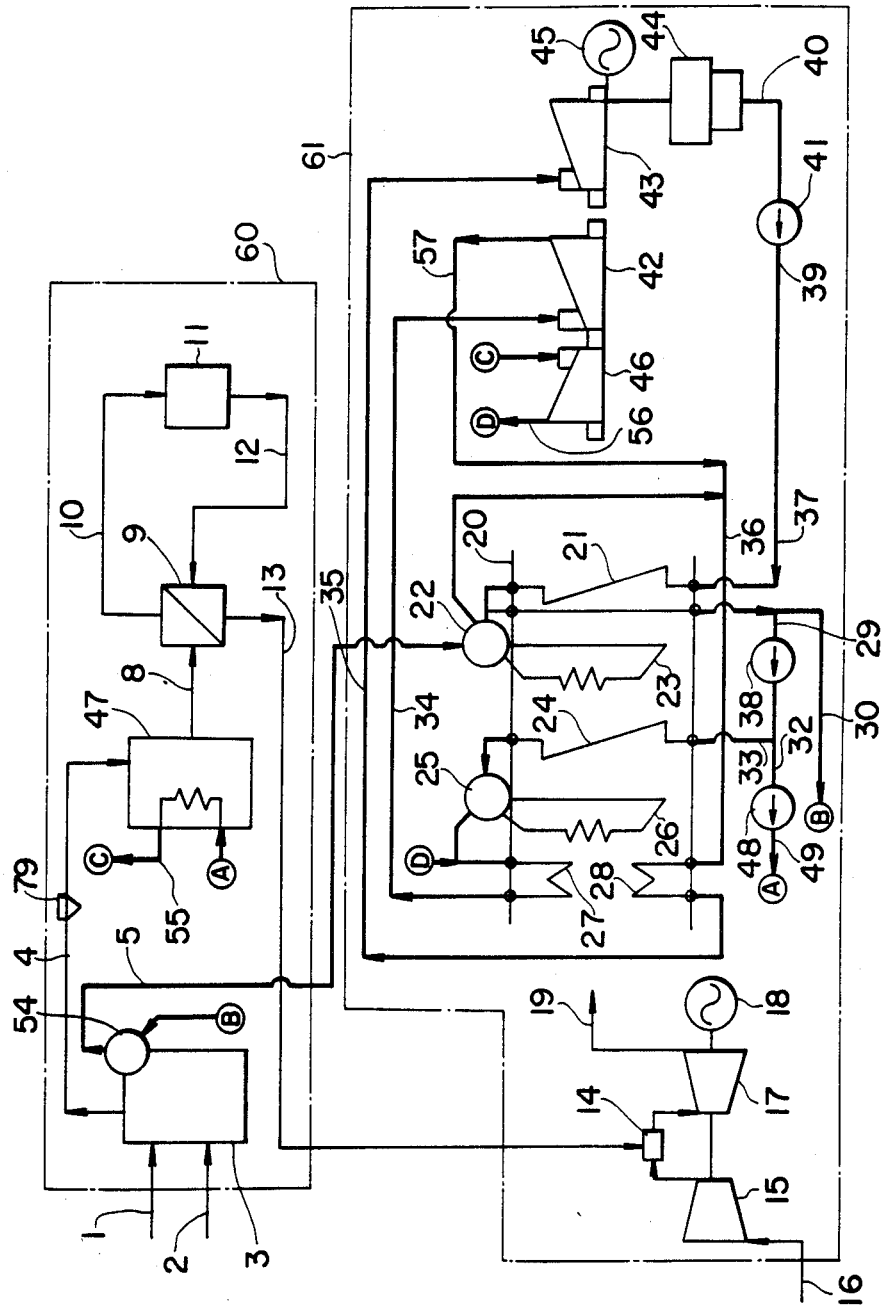

FIG. 12 shows the heat cycle of a fourth embodiment of the invention.

This embodiment is discriminated from the preceding embodiments in that a through-flow type steam generator is used as the steam generator for recovering the sensible heat of the gas 4 at the gasification furnace outlet.

In the through-flow type steam generator 47, the temperature of the water in the tube well reaches 1400° F., so that the temperature of the metal constituting the tube becomes much higher than that of the metal of the water tubes in the drum type steam generator. In the steam generator 47 in this embodiment, therefore, a double-wall tube structure is adopted in the zone where the temperature is specifically high.

The feed water line is branched at the outlet of the low-pressure economizer 21 into three lines: namely, a line leading to the low-pressure drum 22, a line 30 leading to the gasification furnace cooling system, and a line 29 leading to the high-pressure feed water pump 38. The feed water in the line 29 is boosted by the high-pressure feed water pump 38 and is delivered to the feed water line 33 leading to the high-pressure economizer 24 and the feed water line 32 leading to the through-flow type steam generator. The feed water in the line 33 is delivered through the high-pressure economizer 24 into the high-pressure drum 25 to generate steam therein.

In the steam generator of through-flow type, the feed water supplied by the feed water pump from one end of the long pipe is progressively heated and evaporated and then superheated through heat exchange with the unrefined gas, as the water or steam flows towards the other end of the pipe, so that superheated steam is obtained at the other end of the long pipe. The through-flow type steam generator, therefore, exhibits superior operation and control characteristics as compared with the drum-type steam generator.

The supply of the feed water to the through-flow type steam generator 47 is made by means of the super-high pressure feed water pump 48.

The super-high pressure steam 55 generated by the through-flow type steam generator 47 is sent to the super-high pressure steam turbine 46 and expands through the latter to drive the alternator 48 thereby to produce electric power. The steam is then mixed with the steam generated in the high-pressure drum 20 of the waste heat boiler 20 and the mixture steam is then supplied to the high-pressure turbine 42 through the superheater 27. In order to make an efficient recovery of heat from the exhaust gas 19 from the gas turbine, the pressure of the main steam 34 at the inlet to the high-pressure turbine 42 is preferably selected a sub-critical pressure of 1800 to 2400 psig, in order to achieve high thermal efficiency of the plant.

In the described embodiment, it is necessary that the pressure of the steam 56 discharged from the super-high pressure turbine is higher than the pressure of the main steam 34 at the inlet to the high-pressure turbine 42.

Therefore, when the pressure of the main steam 34 at the inlet to the high-pressure turbine 42 is high, it is not possible to obtain sufficiently large heat drop across the super-high pressure turbine. In such a case, the design of the super-high pressure turbine 46 is made difficult. The heat cycle of this embodiment, in which the steam 56 from the super-high pressure turbine 46 is mixed with the steam generated in the steam drum 25 of the waste heat boiler 20 and supplied to the high-pressure turbine after superheating, is quite effective particularly in the case where the condition of the super-high pressure steam 55 is hyper-super critical pressure.

The main steam 34 at the inlet to the high-pressure turbine 42 expands through the high-pressure turbine 42 and is then mixed with the steam generated in the low-pressure drum 22 and the steam generated in the drum-type steam generator 54 in the gasification furnace 3. The mixture steam is then sent to the medium-low pressure turbine 43 through the reheater 28. The steam then expands through the medium-low pressure turbine to drive an alternator 45 thereby to produce electric energy.

FIG. 2 shows the increment of the thermal efficiency achieved by this embodiment. It will be seen that about 2.4%, 2.7% and 3% increments (relative values) of the thermal efficiency are obtainable when the pressure in the gas cooler 54 of the gasification furnace is increased from 550 psig up to 3500 psig, 4500 psig and 5000 psig, respectively.

Figure 13:
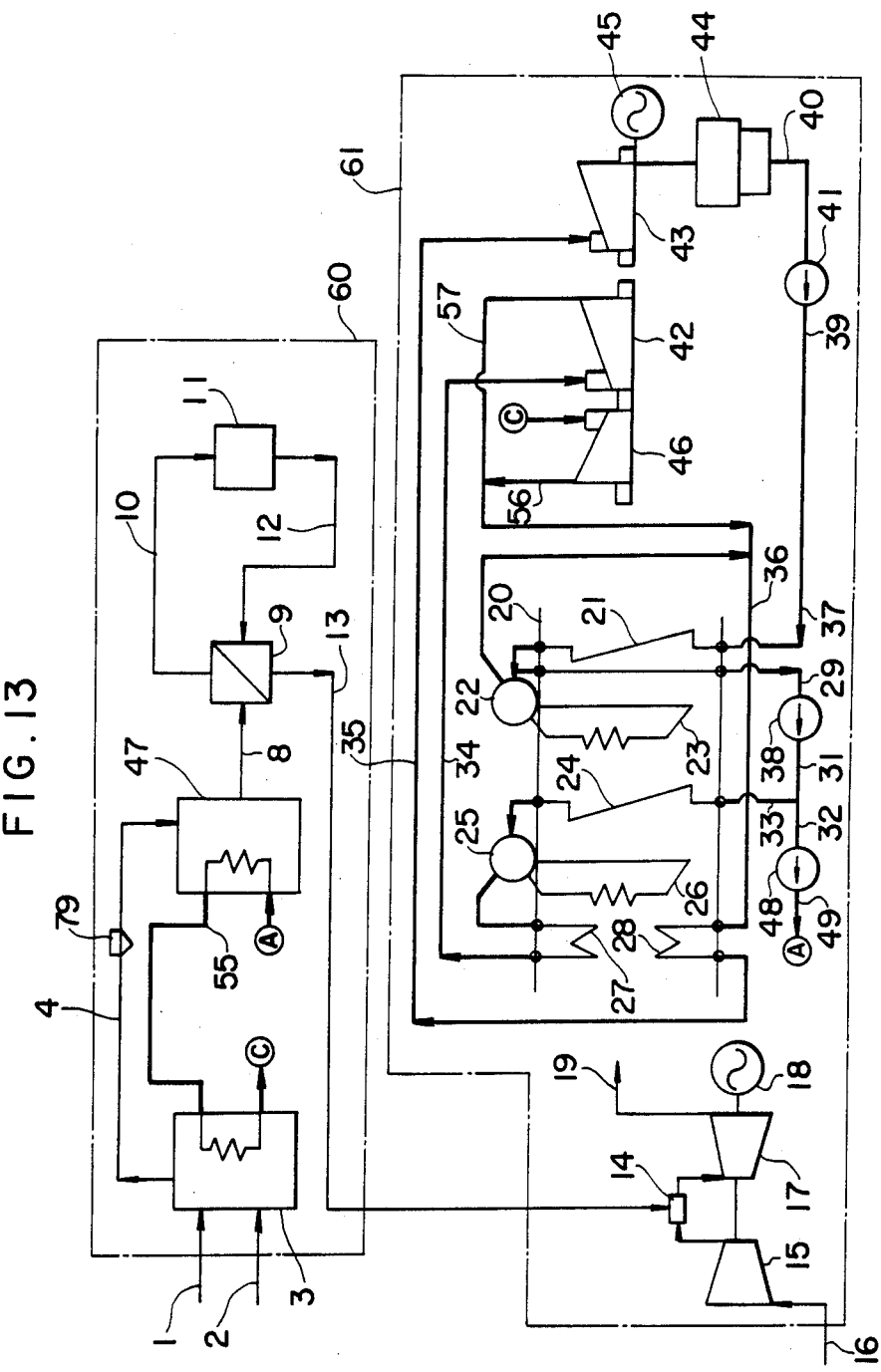

FIG. 13 shows a fourth embodiment of the invention in which the gas cooler 54 of the gasification furnace and the steam generator 47 at the furnace outlet are constructed as an integral through-flow type steam generator. In this embodiment, about 4.7% increase (relative value) of the thermal efficiency is attained by increasing the steam pressure from 550 psig up to 4500 psig. In this embodiment, the thermal load imposed on the water-cooled furnace wall of the gasification furnace is increased so that double-wall type tube structure is employed. In order to compensate for the reduction of the heat transfer across the tube wall, the length of the pipe is increased. In order to accomodate the tubes of greater length, the gas cooling zone is made to have an inversed U-shaped construction or only the cooling zone is divided into two sections.

Figure 14:
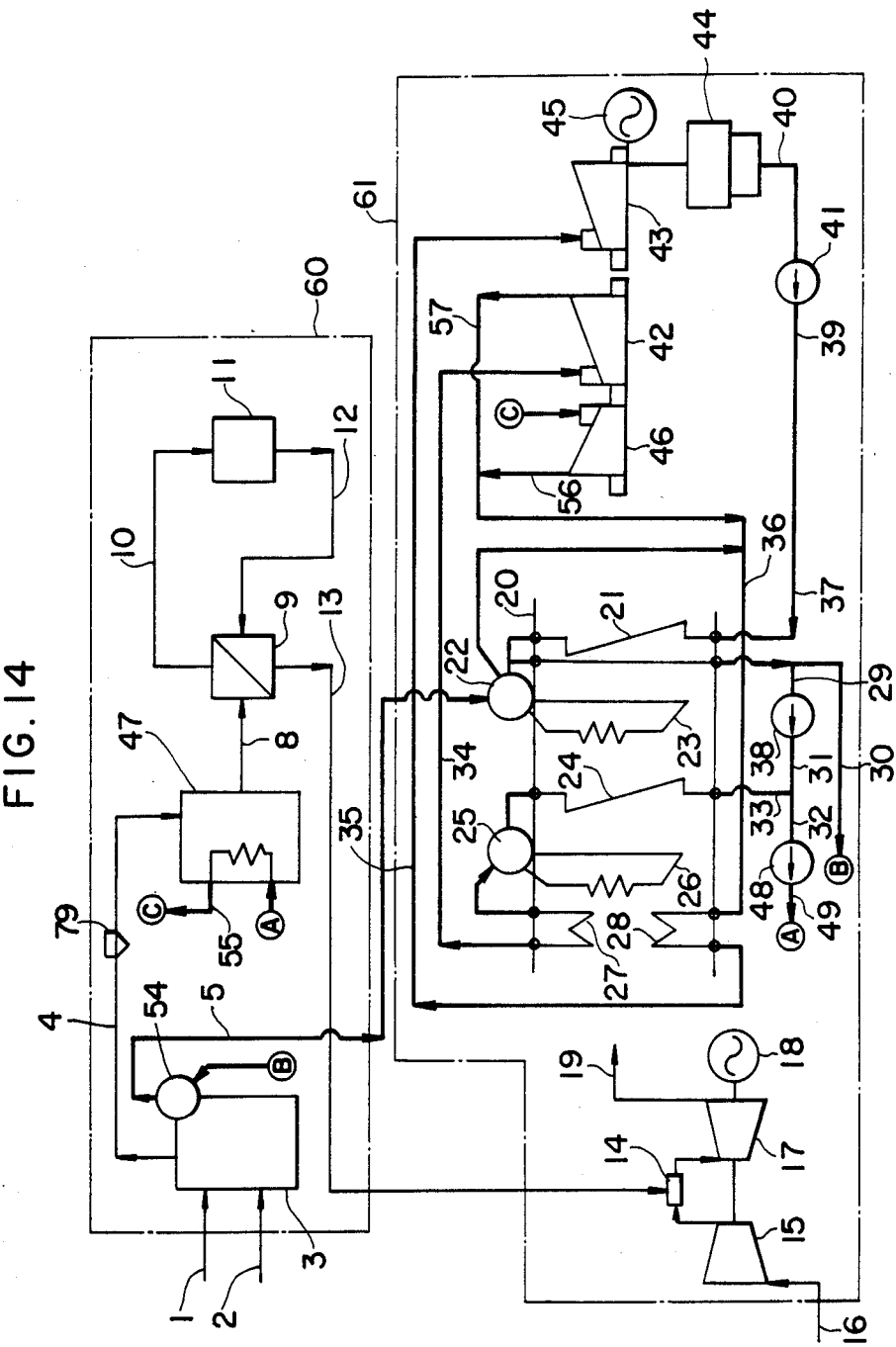

FIG. 14 shows the heat cycle of a fifth embodiment of the invention. This embodiment is discriminated from the fourth embodiment in that the steam exhausted from the super-high pressure turbine 46 is mixed with the steam 57 from the high-pressure turbine 42.

If the steam pressure in the through-flow type steam generator is critical pressure while the steam pressure at the inlet to the high-pressure turbine is sub-critical, a pressure drop of only about 1000 psig is obtainable across the super-high pressure turbine. The fifth embodiment shown in FIG. 14 is free from the following problems as will be understood from the following description. Namely, in the described embodiment of the invention, the steam 56 from the super-high pressure turbine 46 is mixed with the steam 57 from the high-pressure turbine 42 and the steam generated in the low-pressure drum 22, and the mixture steam is supplied to the medium-low pressure turbine after a reheating in the reheater 28. According to this arrangement, the load is shared by all turbines at a good balance and the thermal stress caused by the mixing of steam of different temperatures can be diminished. According to this fifth embodiment, about 2.4% increase of the thermal efficiency (relative value) is attained by increasing the steam pressure in the steam generator at the furnace outlet from 550 psig up to 3500 psig.

Figure 15:
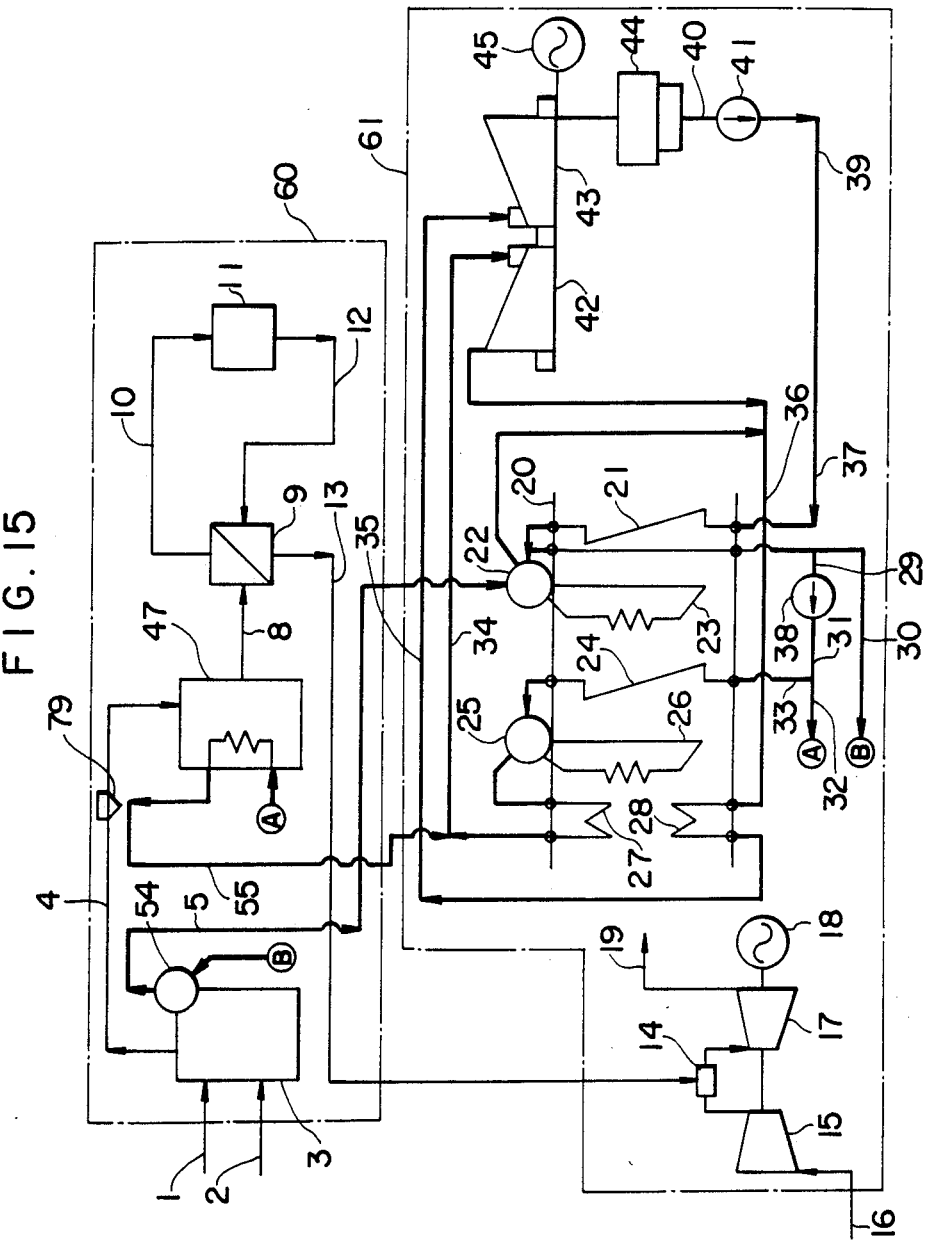

FIG. 15 shows a sixth embodiment of the invention. In the fourth and fifth embodiment of the invention, the pressure of the steam generated in the through-flow type steam generator 47 is selected to be higher than the sub-critical pressure which is the limit pressure for the drum-type steam generator 7, while the waste heat boiler 20 is a drum-type steam generator because the temperature of the exhaust gas 19 from the exhaust gas is about 600° C. at the highest. In contrast, in the sixth embodiment, not only the steam generated in the through-flow type steam generator 47 but also the steam produced by the waste heat boiler 20 have sub-critical pressure of 2400 psig. The steam generated in the through-flow type steam generator 47 is mixed with the superheated steam coming from the waste heat boiler 20 and the mixture steam is introduced to the high-pressure turbine. According to this embodiment, about 1.5% increase (relative value) can be attained by increasing the pressure of the steam in the steam generator 47 at the gasification furnace outlet from 550 psig up to 2400 psig.

As will be understood from the foregoing description, in the coal gasification composite power generating plant of the invention, the gas temperature at the gasification furnace outlet is lowered to such a level as not to permit the scattering of the molten ash to the gasification furnace outlet, so that the thermal load applied to the water tubes constituting the water-cooled furnace wall of the gasification furnace can be descreased. Consequently, it is possible to establish a higher steam pressure in the steam generator at the gasification furnace outlet than in the gas cooler of the gasification furnace thereby attaining a higher thermal efficiency of the plant as a whole, while suppressing the corrosion of the metals of the water tubes constituting the water-cooled wall of the gasification furnace.

Figure 16:
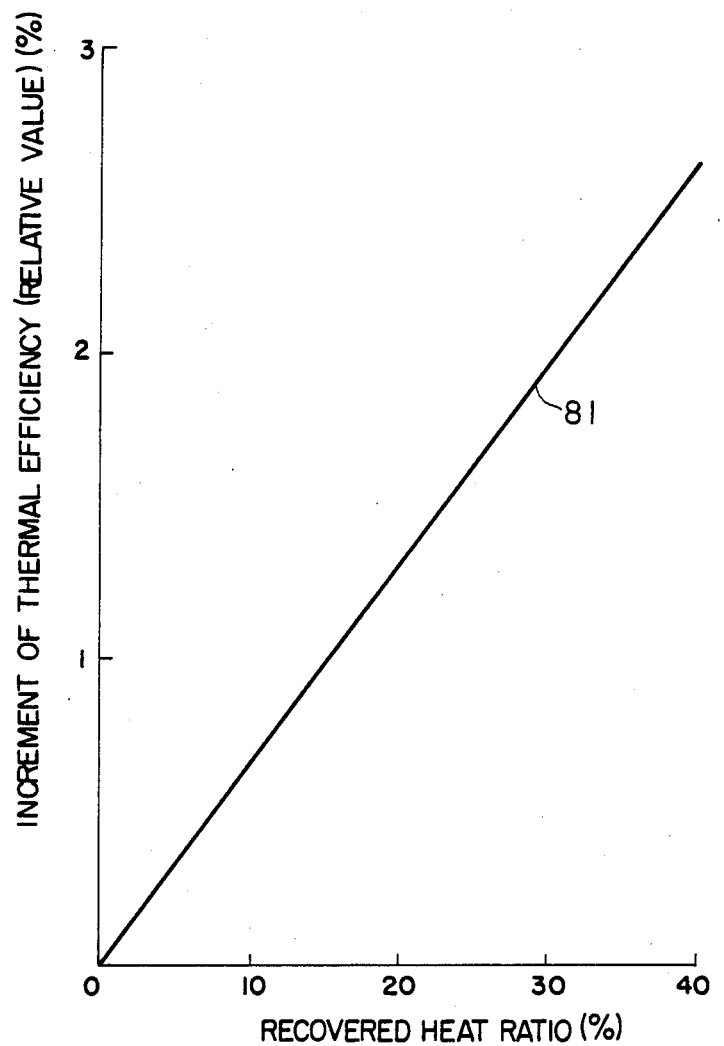
FIG. 16 is a graph showing the relationship between the recovered heat ratio and increment of the thermal efficiency.

FIGS. 16 and 17 show how the thermal efficiency of the coal gasification composite power generating plant is increased in accordance with the invention. More specifically, the curve 81 represents the increment (relative value) of the thermal efficiency in relation to the recovered heat ratio which is the ratio of the heat recovered by generation of high-pressure steam in the steam generator at the gasification furnace outlet and in the gas cooler of the gasification furnace to the heat inputted in the form of coal.

It will be seen that the thermal efficiency increases as the recovered heat ratio is increased, i.e. as the ratio of the heat recovered through generation of the high-pressure steam is increased. Generally, in the gasification furnace using oxygen as the gasification agent, when the gas temperature at the gasification furnace outlet is selected to be about 1800° F., about 5 to 15% of the heat inputted in the form of coal is recovered by the gas cooler of the gasification furnace, while about 5 to 10% of the same heat input is recovered by the steam generator at the gasification furnace outlet. Consequently, in the heat cycle of the first embodiment in which the heat is recovered through generation of high-pressure steam by the steam generator at the outlet of the gasification furnace, the thermal efficiency is increased by about 0.4 to 0.7% in terms of relative value.

In the second and third embodiments in which a part of the gas cooler of the gasification furnace recovers the heat through generation of high-pressure steam, about 0.7 to 1.4% increase of the thermal efficiency is attained.

When air is used as the gasification agent, the total amount of the gas is increased by an amount corresponding to the nitrogen content of the air. Therefore, about 10 to 20% and about 15 to 20% of the heat inputted in the form of coal are recovered by the gas cooler of the gasification furnace and the steam generator at the gasification furnace outlet, respectively. Therefore, when air is used as the gasification agent, about 0.7 to 1.0% increase of the thermal efficiency in terms of relative value is achieved in the first embodiment, whereas, in the second and third embodiments, the increment of the thermal efficiency is about 1 to 2% in terms of relative value.

FIG. 17 shows the increment (relative value) of the thermal efficiency of the plant using the through-flow type steam generator disposed at the outlet of the gasification furnace, on the basis of the thermal efficiency attained when the steam pressure in the steam generator at the gasification furnace outlet is 550 psig. The data shown in this Figure was obtained with a system which makes use of oxygen as the gasification agent, and the amounts of the heat recovered by the gas cooler of the gasification furnace and the heat recovered by the steam generator at the gasification furnace outlet are assumed to be 10% and 8% in terms of relative value to the heat inputted in the form of coal. In this Figure, the axis of abscissa represents the main steam pressure, while the axis of ordinate represents the increment (relative value) of the thermal efficiency of the plant.

As denoted by 51, about 2.4% increase (relative value) of the thermal efficiency is attained when the conditions of the steam at the inlet of the super-high pressure turbine and the steam at the high-pressure turbine are selected to be 3500 psig/1000° F. and 2400 psig/1000° F., respectively. Almost equivalent increase of the thermal efficiency is achieved in the fourth and fifth embodiment.

When the steam conditions at the inlet of the super-high pressure turbine and at the high-pressure turbine are selected to be 4500 psig/1000° F. and 2400 psig/1000° F., respectively, about 2.7% increase of the thermal efficiency is attained as denoted by 52.

The increment of the thermal efficiency is further increased to about 3%, when higher steam conditions, namely, 500 psig/1200° F. and 2400 psig/1000° F. are used at the inlet of the super-high pressure turbine and at the inlet of the high-pressure turbine, respectively, as denoted by 53.

Although the invention has been described through specific terms, it is to be noted here that the described embodiments are not exclusive and various changes and modifications may be imparted thereto without departing from the scope of the invention which is limited solely by the apended claims.

WHAT IS CLAIMED IS:

1. A coal gasification composite power generating plant comprising:
    a coal gasification plant having a coal gasification furnace of pressurized fluidized bed type, in which coal is gasified at a pressure higher than the atmospheric pressure, a first steam generator for recovering heat from the gas generated in said gasification furnace thereby to cool said gas, a second steam generator disposed at the outlet of said coal gasification furnace and adapted to recover heat from the unrefined gas coming out of said gasification furnace, and a gas refining apparatus for refining the unrefined gas which has been cooled through heat recovery by said second steam generator; and
    a composite power generating plant including a gas turbine which operates using the gas generated by said gasification plant as the fuel, a boiler for recovering heat wasted from said gas turbine, and high-pressure and low-pressure steam turbines which operate with the steam generated by said boiler;
    wherein the improvement comprises that the steam generated in said second steam generator has a pressure higher than that of the steam generated in said first steam generator, and the low-pressure steam and the high-pressure steam from said steam generators are introduced, respectively, to said low-pressure steam turbine and said high-pressure steam turbine.

2. A coal gasification composite power generating plant according to claim 1, wherein said waste heat boiler has a low-pressure drum and a high-pressure drum, the steam generated in said low-pressure drum and the steam generated in said high-pressure drum are mixed with the steam generated in said first steam generator and the steam generated in said second steam generator, respectively, and the mixtures of the steam are introduced, respectively, to said low-pressure steam turbine and said high-pressure steam turbine.

3. A coal gasification composite power generating plant according to claim 1, characterized by further comprising a third steam generator separate from said first steam generator and adapted to recover heat from said gas generated in said furnace thereby to cool said gas, said third steam generator being adapted to generate steam of the same pressure as that produced in said second steam generator, the steam produced in said second steam generator and the steam generated in said third steam generator are mixed with each other and the mixture steam is introduced to said high-pressure steam turbine.

4. A coal gasification composite power generating plant according to claim 3, wherein said second steam generator has a steam drum which is communicated with said third steam generator.

5. A coal gasification power generating plant according to claim 3, wherein both of said second and third steam generators are through-flow type steam generators having no steam drum.

* * * * *